June 13, 1950  W. C. DENISON, JR  2,511,332

AGITATOR FOR POWDER FEEDING APPARATUS

Filed Oct. 7, 1948

INVENTOR
WILLIAM C. DENISON JR.
BY
Herschel C. Imokundro
attorney

Patented June 13, 1950

2,511,332

UNITED STATES PATENT OFFICE 2,511,332

AGITATOR FOR POWDER FEEDING APPARATUS

William C. Denison, Jr., Powell, Ohio, assignor to The Denison Engineering Company, Columbus, Ohio, a corporation of Ohio Application October 7, 1948, Serial No. 53,278

4 Claims. (Cl. 18—30)

This invention relates generally to apparatus for forming articles from powdered materials and is more specifically directed to mechanisms for transferring and feeding powdered materials to dies, in which articles are formed from the powdered materials.

It is an object of this invention to provide apparatus for transferring pulverized material from a hopper to a mold and to provide such apparatus with mechanism whereby the powdered materials will be readily discharged from the apparatus when it is in registration with a mold.

A further object of the invention is to provide apparatus for transferring pulverized material from a loading point to a discharge point and to provide such apparatus with an agitator having a plurality of surfaces which urge the material in an upward direction when the agitator is moved relative to the transferring apparatus.

A still further object of the invention is to provide apparatus for transferring pulverulent material from a hopper to a mold, the apparatus including a compartment forming member and an agitator disposed in said compartment forming member for movement therewith and relative thereto. The apparatus also including an actuating mechanism for reciprocating the compartment forming member between loading and unloading positions, there being a direct connection between the agitator and the actuator and a lost motion connection between the latter and the compartment forming member, so that relative movement will take place between the agitator and the compartment forming member upon the initiation of operation in either direction by the actuator.

Another object of the invention is to provide powder transferring apparatus of the type mentioned in the preceding paragraphs with agitating means so constructed as to cause the powdered material to move into a mold in such a way that a more uniform distribution of the powder in the mold will be secured.

This invention relates to the type of apparatus for transferring pulverized material to a mold shown in the copending application Serial No. 790,165 of Willard K. Carter, filed December 6, 1947, and assigned to The Denison Engineering Company.

Further objects and advantages of the present invention will be apparent from the following description, reference being had to the accompanying drawings wherein a preferred form of embodiment of the invention is clearly shown.

Figure 1:
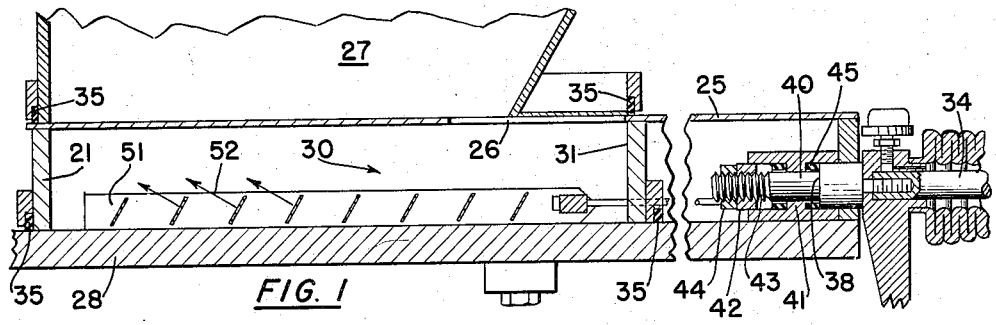
Fig. 1 is a vertical, longitudinal sectional view taken through a feeding mechanism formed in accordance with the present invention.

Referring more particularly to the drawing, the numeral 20 designates the compartment-forming member of a feeding apparatus of the type shown in the above-mentioned copending application to which attention is directed for further information regarding the press to which the feeding mechanism is applied. The actuating means for the feeding mechanism is also shown in this copending application.

The compartment forming member 20 is of substantially rectangular form including front, rear and side walls 21, 22 and 23, respectively. These walls 23 form a rectangular compartment 24 which is open at the bottom and is partly closed at the top by a plate 25, this plate having an opening 26 to permit powdered materials to gravitate into the compartment 24 from a hopper 27 located at the loading point of the transferring apparatus. The compartment forming member or box 20, as it will be hereinafter termed, is disposed on a flat plate 28, which forms a part of a press, in which the powdered materials are transformed into finished articles.

Suitable guiding means (not shown) may be provided for the box to insure the proper movement thereof from a position in registration with the hopper 27 to a discharge position over a mold (not shown).

The present invention relates to the construction of an agitator, indicated generally by the numeral 30, and it is therefore, believed that only bare details of the powder transferring box and other mechanisms are necessary herein for an understanding of the invention.

Figure 2:
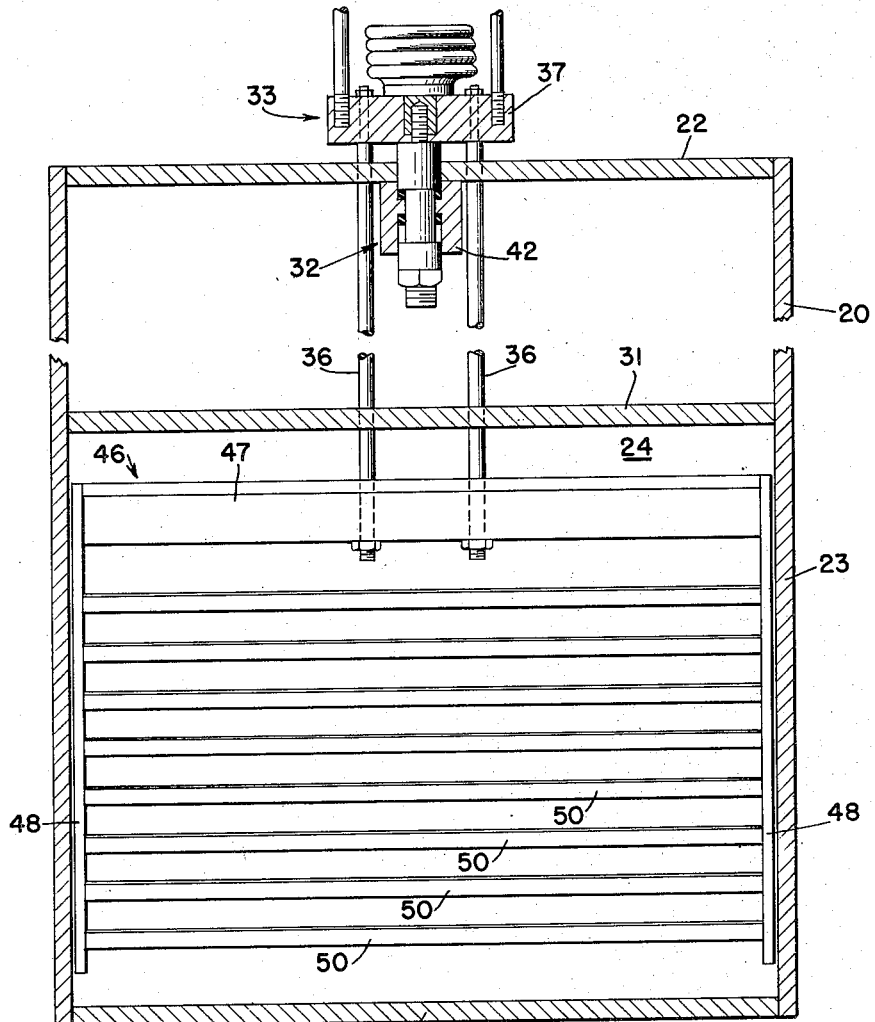
Fig. 2 is a detail horizontal sectional view taken on the plane indicated by the line II—II of Fig. 1.

The box 20 has a partition 31, extending transversely between the side members 23 to separate the powder receiving compartment 24 from the rear portion of the box, this rear portion containing a lost motion connection indicated generally by the numeral 32. This lost motion connection 32 joins the material transferring box to an actuator 33, the forward portion only of which is illustrated in the drawing. This actuator may be of any suitable type, a hydraulic power unit, including a cylinder and piston, being shown in the copending application, the piston rod thereof, being indicated in Fig. 1 of the accompanying drawing by the numeral 34. Suitable control mechanism is provided to cause the reciprocation of the piston in the power cylinder, which reciprocatory movement is transferred by the piston rod 34 to the box 20 and the agitator 30 disposed therein. To maintain the surface of the supporting plate 28 clean, so that no undue resistance to movement of the box 20 will be developed, the front wall 21 and the partition 31 are provided with resilient wiping strips 35, similar strips also being provided between the lower edges of the hopper 27 and the top plate 25 of the box 20. As illustrated in Fig. 2, the agitator 30 is directly connected by rods 36 with the power unit, the latter having a cross head 37 secured to the outer end of the piston rod 34. It will be seen from the foregoing that when the piston rod of the power unit is reciprocated, the motion thereof will be transmitted directly to the agitator 30 through the rods 36. It will also be obvious that due to the lost motion connection 32 the motion of the rod 34 will also be transferred to the box 20, but initial movement of the box 20 will be delayed until after the agitator has started to move. Due to the difference in starting instants of the agitator and box 20, the powdered material in the latter will be agitated.

As pointed out in the above-mentioned copending application, the control mehcanism for the power cylinder is of such type that when the box 20 has been brought into registration with the mold a series of vibratory impulses, or, reciprocations will be imparted to the piston of the power unit to cause a relatively rapid vibration on the part of the agitator. This vibration will shake the contents of the box 20, causing the same to be rapidly discharged into the mold. Any tendency of the powdered material to pack in the box 20 will be counteracted.

The lost motion connection 32 is substantially identical with that shown in the above-mentioned copending application; it includes a stud which projects from the cross head 37 through the rear wall 22 of the box 20, this stud is provided with a shoulder 38 and an extension 40 projecting therefrom, through a web 41 formed in a block 42, secured to the inner face of the wall 22. The extension 40 is threaded at its outer end as at 42 to receive a threaded ferrule 43 and a lock nut 44. The spacing between the ferrule and the shoulder 38 is such as to permit the piston rod 34 to move a limited distance in either direction without transmitting motion to the box 20. Shock absorbing rings 45 are provided between the shoulder, the ferrule and the web 41.

The agitator 30 includes a frame 46 having a transversely extending rear bar 47 to which the rods 36 are attached and spaced side bars 48 secured to the ends of the bar 47. The side bars 48 are disposed in close proximity to the side walls of the box 20 and are attached to the ends of spaced transversely extending agitating elements 50. In the form of the invention illustrated, the elements 50 are composed of strip material but it should be obvious that bars or other shapes could be employed if desired. These elements provide upwardly and rearwardly sloping surfaces 51, which are normal to forwardly and upwardly lines of force indicated by the arrows 52 in Fig. 1. These arrows 52 indicate the direction in which materials will be propelled by the elements 50 when the agitator is vibrated after the box 20 has been moved into registration with the mold. It should be obvious that the agitator will tend to break up packed powdered material or prevent any tendency of the material to form cakes. Due to the spacing and the inclination of the bars, the material will be conveyed step-by-step toward the forward portion of the box by the successive vibrations of the agitator. Due to the step-by-step movement of the powdered material and the elevation thereof between each step, the material will be caused to pack a trifle more firmly in the forward portion of the mold and when the box 20 is retracted will cause a more uniform distribution of the powder in the mold, thus compensating for the tendency of the forward wall 21 of the box to pack the material more firmly at the rear portion of the mold during the retraction of the box after the mold has been filled. It has been found that heretofore the striking-off of the powdered material by the forward wall of the box caused an undue packing of material at the rear portion of the mold. When this material was pressed to form an article, the article did not have a uniform density throughout the entire width. By providing the inclined agitator bars, the powdered material is conveyed to the forward part of the mold by a tossing procedure, which causes a slightly greater compaction and concentration of the material in this portion of the mold and upon the withdrawal of the box, a more uniform filling of the mold results. When the material in the mold thus filled is compressed, the resulting article has a more uniform density.

While the invention has been illustrated in one of its simplest forms, it should be obvious that any minor variations may be made therein without departing from the fundamental principles of the invention.

While the form of embodiment of the present invention as herein disclosed constitutes a preferred form, it is to be understood that other forms might be adopted, all coming within the scope of the claims which follow:

I claim:

1. In apparatus for transferring pulverulent material from a loading to a discharge point, a plate-like support; a compartment forming member disposed on said support for movement between loading and discharge points; agitator means in the compartment in said member, said agitator means having a plurality of spaced transversely extending upwardly and rearwardly tilted strips disposed for movement with and relative to said member; and actuating means for reciprocating said member and agitator, initial operation of said actuating means in either direction serving to move said agitator relative to said member prior to moving said member.

2. In apparatus for transferring pulverulent material from a loading to a discharge point, a plate-like support; a compartment forming member disposed on said support for movement between loading and discharge points; agitator means in the compartment in said member, said agitator means having a plurality of spaced transversely extending bar elements with rearwardly and upwardly tilted front surfaces disposed for movement with and relative to said member; and actuating means for said member and agitator, initial operation of said actuating means in either direction serving to move said agitator relative to said member prior to moving said member.

3. In apparatus for transferring pulverulent material from a loading to a discharge point, a plate-like support; a compartment forming member disposed on said support for movement between loading and discharge points; agitator means in the compartment in said member, said agitator means having a plurality of spaced transversely extending bar elements with upwardly and rearwardly sloping front surfaces and connecting bars at the ends of said elements all said bars being movable relative to and in unison with said member; actuating means for said member and agitator; means directly connecting said agitator to said actuating means; and a lost motion connection between said actuating means and said member.

4. In apparatus for transferring pulverulent material from a loading to a discharge point, a compartment forming member disposed for reciprocation between loading and discharging positions; agitator means in the compartment in said member, said agitator means having a frame and a plurality of upwardly and rearwardly sloping transversely extending members; and a lost motion connection between said member and said agitator.

WILLIAM C. DENISON, JR.

REFERENCES CITED

The following references are of record in the file of this patent:

UNITED STATES PATENTS

| Number | Name | Date |
|---|---|---|
| 1,308,213 | Yingling | July 1, 1919 |
| 1,393,270 | Downard | Oct. 11, 1921 |